US010297850B2

(12) United States Patent
Fukumizu et al.

(10) Patent No.: US 10,297,850 B2
(45) Date of Patent: May 21, 2019

(54) MEMBRANE ELECTRODE ASSEMBLY (71) Applicant: HONDA MOTOR CO., LTD., Minato-Ku, Tokyo (JP)

(72) Inventors: Takao Fukumizu, Utsunomiya (JP); Hiroshi Matsumori, Utsunomiya (JP); Yoichi Asano, Utsunomiya (JP); Takuma Yamawaki, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 186 days.

(21) Appl. No.: 14/221,865

(22) Filed: Mar. 21, 2014

(65) Prior Publication Data

US 2014/0295315 A1 Oct. 2, 2014

(30) Foreign Application Priority Data

Mar. 26, 2013 (JP) .................................. 2013-064901
Feb. 28, 2014 (JP) .................................. 2014-038054

(51) Int. Cl.
*H01M 8/10* (2016.01)
*H01M 8/1004* (2016.01)
*H01M 8/0234* (2016.01)
*H01M 8/0239* (2016.01)

(52) U.S. Cl.
CPC ........ *H01M 8/1004* (2013.01); *H01M 8/0234* (2013.01); *H01M 8/0239* (2013.01)

(58) Field of Classification Search
CPC . H01M 8/1004; H01M 8/0239; H01M 8/0234
USPC ........................................................ 429/481
See application file for complete search history.

(56) References Cited

U.S. PATENT DOCUMENTS

| 6,194,094 B1 * | 2/2001 | Sugawara ........... H01M 4/8807 429/414 |
| 7,910,259 B2 * | 3/2011 | Lee et al. ...................... 429/474 |
| 8,304,145 B2 * | 11/2012 | Wieser et al. ................ 429/534 |
| 2005/0260476 A1 | 11/2005 | Xie |
| 2009/0035634 A1 * | 2/2009 | Ohma ............................ 429/30 |

(Continued)

FOREIGN PATENT DOCUMENTS

| JP | 2005-332672 A | 12/2005 |
| JP | 2010-040377 A | 2/2010 |

(Continued)

OTHER PUBLICATIONS

Office Action dated Jan. 10, 2017 issued over the corresponding Japanese Patent Application No. 2014-038054 with the English translation of pertinent portion.

*Primary Examiner* — Philip A. Stuckey
(74) *Attorney, Agent, or Firm* — Carrier Blackman & Associates, P.C.; William D. Blackman; Joseph P. Carrier (57) ABSTRACT

A membrane electrode assembly is prepared by sandwiching an electrolyte membrane between an anode and a cathode. In the anode, a first porous layer is interposed between a first electrode catalyst layer and a first gas diffusion layer. In the cathode, a second porous layer is interposed between a second electrode catalyst layer and a second gas diffusion layer. A first piled body of the first gas diffusion layer and the first porous layer has a percolation pressure higher than that of a second piled body containing the second gas diffusion layer and the second porous layer. The first piled body has a percolation pressure of 25 to 120 kPa, and the second piled body has a percolation pressure of 5 to 25 kPa.

5 Claims, 3 Drawing Sheets

| | PASTE FOR FIRST POROUS LAYER | FORMATION OF FIRST POROUS LAYER | SEEPAGE PRESSURE OF FIRST PILED BODY [kPa] | PASTE FOR SECOND POROUS LAYER | FORMATION OF SECOND POROUS LAYER | SEEPAGE PRESSURE OF SECOND PILED BODY [kPa] | CELL VOLTAGE AT 100 kPa [V] | ΔV [V] |
|---|---|---|---|---|---|---|---|---|
| EXAMPLE 1 | A | BLADE | 25.1 | A | SCREEN | 5.2 | 0.707 | 0.054 |
| EXAMPLE 2 | A | BLADE | 45.4 | A | SCREEN | 5.2 | 0.708 | 0.053 |
| EXAMPLE 3 | A | BLADE | 25.1 | A | SCREEN | 12.4 | 0.706 | 0.050 |
| EXAMPLE 4 | A | BLADE | 26.8 | A | BLADE | 6.8 | 0.708 | 0.052 |
| EXAMPLE 5 | A | BLADE | 26.8 | A | BLADE | 24.2 | 0.702 | 0.038 |
| EXAMPLE 6 | A | BLADE | 93.4 | A | SCREEN | 5.2 | 0.706 | 0.039 |
| EXAMPLE 7 | A | BLADE | 118.2 | A | SCREEN | 5.2 | 0.704 | 0.015 |
| COMPARATIVE EXAMPLE 6 | A | BLADE | 26.8 | NONE | — | 4.2 | 0.672 | -0.024 |
| COMPARATIVE EXAMPLE 7 | A | BLADE | 26.8 | A | BLADE | 26.8 | 0.689 | -0.011 |
| COMPARATIVE EXAMPLE 8 | A | BLADE | 122.6 | A | SCREEN | 5.2 | 0.698 | -0.003 |

(56) References Cited

U.S. PATENT DOCUMENTS

| | | | |
|---|---|---|---|
| 2010/0099011 A1* | 4/2010 | Houghtaling et al. | 429/43 |
| 2010/0221625 A1* | 9/2010 | Jung | H01M 8/023 |
| | | | 429/431 |
| 2012/0178010 A1* | 7/2012 | Ji et al. | 429/450 |
| 2013/0266887 A1 | 10/2013 | Norimoto | |

FOREIGN PATENT DOCUMENTS

| | | |
|---|---|---|
| JP | 2010-146769 A | 7/2010 |
| JP | 2013020762 A | 1/2013 |
| WO | 2012086082 A1 | 6/2012 |

\* cited by examiner

FIG. 2

| | PASTE FOR FIRST POROUS LAYER | FORMATION OF FIRST POROUS LAYER | SEEPAGE PRESSURE OF FIRST PILED BODY [kPa] | PASTE FOR SECOND POROUS LAYER | FORMATION OF SECOND POROUS LAYER | SEEPAGE PRESSURE OF SECOND PILED BODY [kPa] | THICKNESS DISPERSION OF ELECTROLYTE MEMBRANE |
|---|---|---|---|---|---|---|---|
| EXAMPLE 1 | A | BLADE | 25.1 | A | SCREEN | 5.2 | 0.88 |
| EXAMPLE 2 | A | BLADE | 45.4 | A | SCREEN | 5.2 | 0.69 |
| EXAMPLE 3 | A | BLADE | 25.1 | A | SCREEN | 12.4 | 0.90 |
| COMPARATIVE EXAMPLE 1 | A | SCREEN | 5.2 | A | SCREEN | 5.2 | 2.34 |
| COMPARATIVE EXAMPLE 2 | A | BLADE | 18.7 | A | SCREEN | 5.2 | 1.63 |
| COMPARATIVE EXAMPLE 3 | A | BLADE | 23.2 | A | SCREEN | 5.2 | 1.21 |
| COMPARATIVE EXAMPLE 4 | A | BLADE | 23.2 | A | SCREEN | 12.4 | 1.20 |
| COMPARATIVE EXAMPLE 5 | B | SCREEN | 6.3 | A | SCREEN | 5.2 | 2.88 |

FIG. 3

| | PASTE FOR FIRST POROUS LAYER | FORMATION OF FIRST POROUS LAYER | SEEPAGE PRESSURE OF FIRST PILED BODY [kPa] | PASTE FOR SECOND POROUS LAYER | FORMATION OF SECOND POROUS LAYER | SEEPAGE PRESSURE OF SECOND PILED BODY [kPa] | CELL VOLTAGE AT 100 kPa [V] | ΔV [V] |
|---|---|---|---|---|---|---|---|---|
| EXAMPLE 1 | A | BLADE | 25.1 | A | SCREEN | 5.2 | 0.707 | 0.054 |
| EXAMPLE 2 | A | BLADE | 45.4 | A | SCREEN | 5.2 | 0.708 | 0.053 |
| EXAMPLE 3 | A | BLADE | 25.1 | A | SCREEN | 12.4 | 0.706 | 0.050 |
| EXAMPLE 4 | A | BLADE | 26.8 | A | BLADE | 6.8 | 0.708 | 0.052 |
| EXAMPLE 5 | A | BLADE | 26.8 | A | BLADE | 24.2 | 0.702 | 0.038 |
| EXAMPLE 6 | A | BLADE | 93.4 | A | SCREEN | 5.2 | 0.706 | 0.039 |
| EXAMPLE 7 | A | BLADE | 118.2 | A | SCREEN | 5.2 | 0.704 | 0.015 |
| COMPARATIVE EXAMPLE 6 | A | BLADE | 26.8 | NONE | — | 4.2 | 0.672 | -0.024 |
| COMPARATIVE EXAMPLE 7 | A | BLADE | 26.8 | A | BLADE | 26.8 | 0.689 | -0.011 |
| COMPARATIVE EXAMPLE 8 | A | BLADE | 122.6 | A | SCREEN | 5.2 | 0.698 | -0.003 |

MEMBRANE ELECTRODE ASSEMBLY

CROSS-REFERENCE TO RELATED APPLICATIONS

This application is based upon and claims the benefit of priority from Japanese Patent Applications No. 2013-064901 filed on Mar. 26, 2013 and No. 2014-038054 filed on Feb. 28, 2014, the contents all of which are incorporated herein by reference.

BACKGROUND OF THE INVENTION

Field of the Invention

The present invention relates to a membrane electrode assembly containing a solid polymer electrolyte membrane and electrodes disposed on either side thereof, wherein each of the electrodes contains an electrode catalyst layer, a gas diffusion layer, and a porous layer interposed between the electrode catalyst layer and the gas diffusion layer.

Description of the Related Art

In a solid polymer fuel cell, a membrane electrode assembly is interposed between a pair of separators to form a unit cell. The membrane electrode assembly contains an ion-exchange polymer electrolyte membrane, an anode facing one surface of the membrane, and a cathode facing the other surface of the membrane.

Each of the anode and the cathode has an electrode catalyst layer and a gas diffusion layer. The electrode catalyst layer is disposed facing the electrolyte membrane, and acts as a reaction field of an electrode reaction. The gas diffusion layer acts to diffuse and supply a reactant gas to the electrode catalyst layer. In general, the gas diffusion layer is composed of a carbon paper or the like. Therefore, for example, a fiber in the gas diffusion layer may be stuck into the electrolyte membrane to physically deform the membrane. In this case, the electrolyte membrane may be deteriorated, and the gas barrier property against the reactant gas may be lowered. Thus, it is necessary to prevent the physical deformation of the electrolyte membrane.

For example, in view of preventing the sticking of the fiber in the gas diffusion layer into the electrolyte membrane through the electrode catalyst layer, in Japanese Laid-Open Patent Publication No. 2010-040377, electrolyte-rich portions are discontinuously arranged in the stacking direction of the electrode catalyst layer, whereby the electrode catalyst layer exhibits a strong binding property in the plane direction.

In general, in the membrane electrode assembly, the overall size (surface area) of the electrode catalyst layer is smaller than that of the electrolyte membrane. Thus, the outer peripheral edge of the electrolyte membrane is exposed on the outside of the electrode catalyst layer. Consequently, for example, when the gas diffusion layer is thermally compression-bonded to the electrolyte membrane in production of the membrane electrode assembly, the fiber in the gas diffusion layer may be disadvantageously stuck into the outer peripheral edge of the electrolyte membrane.

In view of solving the problem, for example, in Japanese Laid-Open Patent Publication No. 2010-146769, a reinforcement member is used for preventing the periphery of the gas diffusion layer from being brought into direct contact with the electrolyte membrane. Specifically, only two opposite sides of the electrolyte membrane are exposed on the outside of the electrode catalyst layer, and the reinforcement member is disposed on each of the two sides to prevent the fiber in the diffusion layer from sticking into the electrolyte membrane.

However, in the technologies of Japanese Laid-Open Patent Publication Nos. 2010-040377 and 2010-146769, as described above, the membrane electrode assembly has a complicated structure containing the specially-configured electrode catalyst layer or electrolyte membrane. Thus, the technologies are disadvantageous in low membrane electrode assembly productivity, increased production cost, etc. In view of avoiding the problem, for example, as described in Japanese Laid-Open Patent Publication No. 2005-332672, a reinforcement layer may be interposed between the electrolyte membrane and the electrode catalyst layer to prevent the sticking of the fiber in the gas diffusion layer into the electrolyte membrane.

SUMMARY OF THE INVENTION

However, in a case where the reinforcement layer is interposed between the electrolyte membrane and the electrode catalyst layer as described in Japanese Laid-Open Patent Publication No. 2005-332672, the water retention ability (the water discharge ability) of the membrane electrode assembly may be changed. For example, when the water retention ability is excessively lowered, the electrolyte membrane is dried and exhibits a low proton conductivity. On the other hand, when the water retention ability is excessively increased, a so-called flooding is caused. In each case, the power generation property of the fuel cell is deteriorated.

In Japanese Laid-Open Patent Publication Nos. 2010-040377, 2010-146769, and 2005-332672, even in the case of forming the additional layer, retention of the power generation property of the fuel cell is not sufficiently considered.

A principal object of the present invention is to provide a membrane electrode assembly having a simple structure capable of desirably preventing physical deformation of an electrolyte membrane.

Another object of the present invention is to provide a membrane electrode assembly having an excellent power generation property.

According to an aspect of the present invention, there is provided a membrane electrode assembly comprising a solid polymer electrolyte membrane sandwiched between an anode and a cathode, wherein the anode contains a first electrode catalyst layer facing the electrolyte membrane, a first gas diffusion layer, and a first porous layer interposed between the first electrode catalyst layer and the first gas diffusion layer, the cathode contains a second electrode catalyst layer facing the electrolyte membrane, a second gas diffusion layer, and a second porous layer interposed between the second electrode catalyst layer and the second gas diffusion layer, a first piled body containing the first gas diffusion layer and the first porous layer has a percolation pressure higher than that of a second piled body containing the second gas diffusion layer and the second porous layer, and the first piled body has a percolation pressure of 25 to 120 kPa and the second piled body has a percolation pressure of 5 to 25 kPa.

In the membrane electrode assembly of the present invention, the porous layer is interposed between the electrode catalyst layer and the gas diffusion layer in each of the anode and the cathode. Furthermore, the percolation pressure of the piled body of the porous layer and the gas diffusion layer is controlled within the above range in each of the anode and the cathode, such that the percolation pressure of the first piled body in the anode is higher than that of the second piled body in the cathode. Consequently, contact of a fiber in the gas diffusion layer with the electrolyte membrane can be avoided, and physical deformation of the electrolyte membrane can be prevented. In addition, excess water can be discharged from the anode and the cathode to rapidly diffuse reactant gases, and the electrolyte membrane can be maintained in a wet state to show an excellent proton conductivity. Thus, a power generation reaction can be accelerated to appropriately improve a power generation property.

The activation overvoltage of the cathode is higher than that of the anode. Therefore, the catalyst amount of the cathode is larger than that of the anode, to lower the activation overvoltage. Thus, in general, the electrode catalyst layer of the anode is thinner than that of the cathode. Consequently, the electrolyte membrane is affected more heavily by undulation or the like of the gas diffusion layer in the anode than that in the cathode.

In the membrane electrode assembly of the present invention, as described above, the percolation pressure of the first piled body in the anode is higher than that of the second piled body in the cathode. Thus, for example, the first porous layer in the first piled body has a lower porosity and is denser than the second porous layer in the second piled body. Consequently, the electrolyte membrane can be desirably prevented from being affected by the gas diffusion layer in the anode as described above.

Meanwhile, the second porous layer is formed in the cathode where water is generated by power generation reaction. Therefore, the reactant gas can be efficiently diffused while preventing flooding, so that the generated water is not excessively transferred to the second gas diffusion layer, and drying of the electrolyte membrane can be prevented.

Accordingly, by controlling the percolation pressures of the first piled body and the second piled body as described above, the membrane electrode assembly can have a simple structure capable of effectively preventing the physical deformation of the electrolyte membrane. Furthermore, the water retention and water discharge properties can be well balanced in the anode and the cathode to improve the power generation property.

In the above-mentioned membrane electrode assembly, it is preferable that the thickness of the first porous layer is equal to or greater than that of the second porous layer. In this case, even if the electrode catalyst layer in the anode is made thinner than that in the cathode as described above, it is possible to effectively diminish the effects of the undulation of the gas diffusion layer in the anode on the membrane electrolyte. Meanwhile, it is also possible to prevent both the flooding in the cathode and drying of the electrolyte membrane by excessive transfer of the generated water to the second gas diffusion layer.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A preferred embodiment of the membrane electrode assembly of the present invention will be described in detail below with reference to accompanying drawings.

Figure 1:
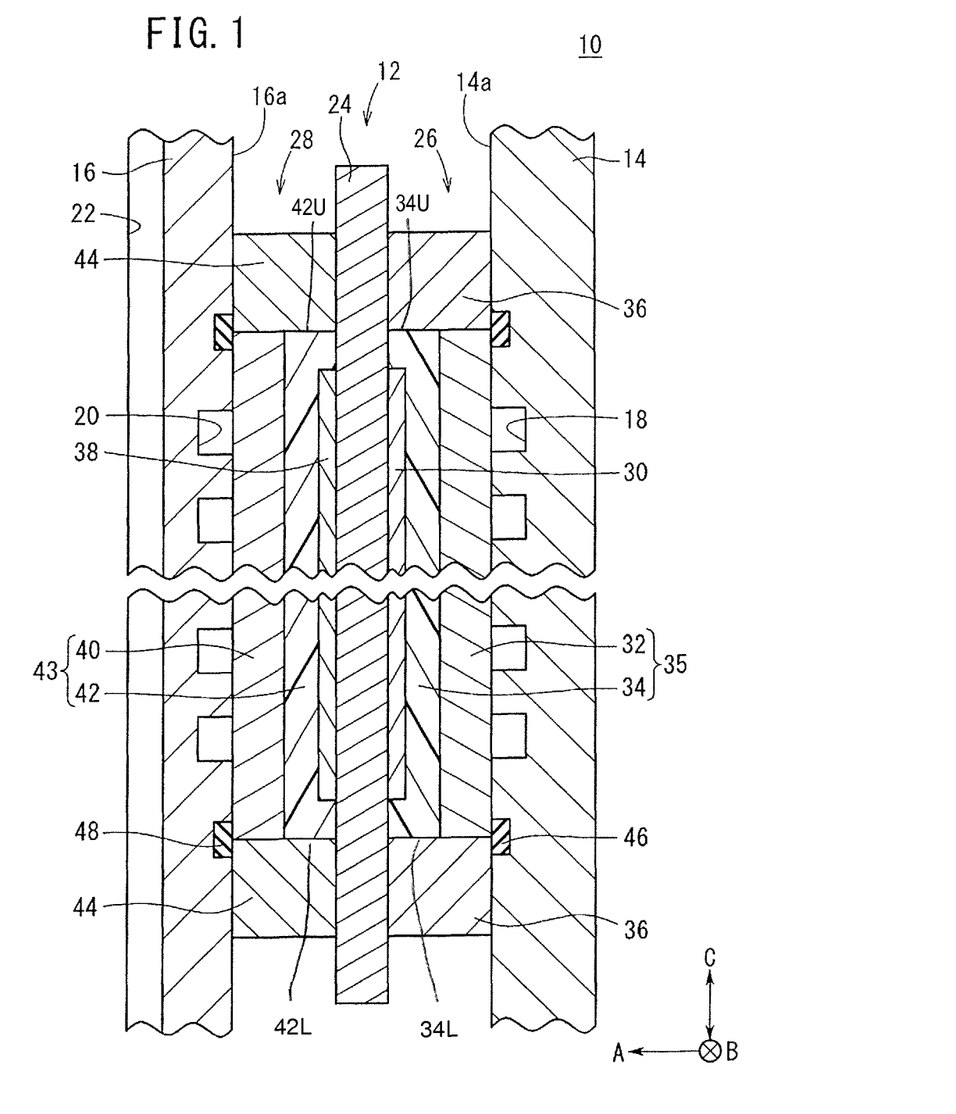
FIG. 1 is a schematic longitudinal sectional view of a principal part of a fuel cell containing a membrane electrode assembly according to an embodiment of the present invention.

FIG. 1 is a schematic longitudinal sectional view of a principal part of a solid polymer fuel cell 10. The fuel cell 10 contains a membrane electrode assembly 12 according to this embodiment.

First, the structure of the fuel cell 10 will be described below. In the fuel cell 10, for example, the membrane electrode assembly 12, an anode-side separator 14, and a cathode-side separator 16 are stacked in the upright positions. For example, a plurality of the fuel cells 10 are stacked in the stacking direction (the arrow A direction of FIG. 1) and used as a vehicle fuel cell stack (not shown). Each of the anode-side separator 14 and the cathode-side separator 16 may be a carbon separator or a metal separator.

A fuel gas flow field 18 extends in the horizontal direction (perpendicular to the paper plane of FIG. 1, hereinafter referred to simply as the B direction) on the surface 14a of the anode-side separator 14 (the surface facing the membrane electrode assembly 12). The fuel gas flow field 18 is communicated with a fuel gas inlet passage for supplying a fuel gas such as a hydrogen-containing gas (not shown) and a fuel gas outlet passage for discharging the fuel gas (not shown).

Similarly, an oxygen-containing gas flow field 20 extends in the horizontal direction (the B direction) on the surface 16a of the cathode-side separator 16 (the surface facing the membrane electrode assembly 12). The oxygen-containing gas flow field 20 is communicated with an oxygen-containing gas inlet passage for supplying an oxygen-containing gas such as an oxygen-containing gas (not shown) and an oxygen-containing gas outlet passage for discharging the oxygen-containing gas (not shown). It should be noted that the fuel gas in the fuel gas flow field 18 and the oxygen-containing gas in the oxygen-containing gas flow field 20 flow in opposite directions.

When a plurality of the fuel cells 10 are stacked, the outer surface of the anode-side separator 14 faces the outer surface of the cathode-side separator 16. A coolant flow field 22 is integrally formed between the outer surfaces. The coolant flow field 22 is communicated with a coolant inlet passage for supplying a coolant (not shown) and a coolant outlet passage for discharging the coolant (not shown).

The membrane electrode assembly 12 contains a solid polymer electrolyte membrane 24, an anode 26, and a cathode 28. The electrolyte membrane 24 is sandwiched between the anode 26 and the cathode 28. The overall size (surface area) of the electrolyte membrane 24 is larger than the overall sizes of the anode 26 and the cathode 28. Therefore, the reactant gas supplied to one of the anode 26 and the cathode 28 is prevented from being transferred through the electrolyte membrane 24 to the other electrode, and leakage of the reactant gas from the membrane electrode assembly 12 to the outside (out leakage) is prevented.

The electrolyte membrane 24 may be a film prepared from a proton-conductive polymer of a cation-exchange resin. For example, the cation-exchange resin may be a vinyl polymer sulfonate such as a polystyrene sulfonate; a polymer provided by introducing a sulfonate or phosphate group to a heat-resistant polymer such as a perfluoroalkyl sulfonate polymer, a perfluoroalkyl carboxylate polymer, a polybenzimidazole, or a polyether ether ketone; a polymer provided by introducing a sulfonate group to a main component of a rigid polyphenylene obtained by polymerizing an aromatic compound having a phenylene chain; etc.

The anode 26 and the cathode 28 are formed such that the electrolyte membrane 24 is sandwiched therebetween. The anode 26 has a first electrode catalyst layer 30, a first gas diffusion layer 32, and a first porous layer 34. The first porous layer 34 and the first gas diffusion layer 32 are piled to form a first piled body 35.

On the other hand, the cathode 28 has a second electrode catalyst layer 38, a second gas diffusion layer 40, and a second porous layer 42. The second porous layer 42 and the second gas diffusion layer 40 are piled to form a second piled body 43.

The first electrode catalyst layer 30 and the second electrode catalyst layer 38 each contain a catalyst particle and an ion-conductive polymer binder. The catalyst particle may be prepared by depositing a catalyst metal such as platinum on a catalyst support such as a carbon black. Alternatively, the catalyst particle may be a catalyst metal particle free of the catalyst support (e.g. a platinum black). The first electrode catalyst layer 30 and the second electrode catalyst layer 38 may each contain two or more catalyst layers having different compositions. The first electrode catalyst layer 30 may be thinner than the second electrode catalyst layer 38, and the first electrode catalyst layer 30 and the second electrode catalyst layer 38 may have different overall sizes.

The first electrode catalyst layer 30 and the second electrode catalyst layer 38 are in contact with the electrolyte membrane 24, and have overall sizes smaller than that of the electrolyte membrane 24. The overall size of the first electrode catalyst layer 30 or the second electrode catalyst layer 38 may be set to substantially the same as that of the electrolyte membrane 24.

For example, the first gas diffusion layer 32 and the second gas diffusion layer 40 each contain a base material of a carbon paper, which is obtained by adding a large number of fibrous carbons to a cellulose. A water-repellent resin such as an FEP (tetrafluoroethylene-hexafluoropropylene copolymer) may be added to the base material. The first gas diffusion layer 32 and the second gas diffusion layer 40 have overall sizes larger than those of the first electrode catalyst layer 30 and the second electrode catalyst layer 38. The overall sizes of the first gas diffusion layer 32 and the second gas diffusion layer 40 may be set to substantially the same as those of the first electrode catalyst layer 30 and the second electrode catalyst layer 38.

Each of the first porous layer 34 and the second porous layer 42 is a porous layer containing an electron-conductive substance and a water-repellent resin. The first porous layer 34 and the second porous layer 42 have an electric conductivity based on the electron-conductive substance. Preferred examples of the electron-conductive substances include furnace blacks (such as KETJEN BLACK EC and KETJEN BLACK EC-600JD available from Ketjen Black International Company, VULCAN XC-72 available from Cabot Corporation, TOKABLACK available from Tokai Carbon Co., Ltd., and ASAHI AX available from Asahi Carbon Co., Ltd., trade names), acetylene blacks (such as DENKA BLACK available from Denki Kagaku Kogyo K.K., trade name), ground products of glassy carbons, vapor-grown carbon fibers (such as VGCF and VGCF-H available from Showa Denko K.K., trade names), carbon nanotubes, graphitized powders thereof, and mixtures of the powders.

Examples of materials of the water-repellent resins include crystalline fluororesins such as ETFE (tetrafluoroethylene-ethylene copolymers), PVDF (polyvinylidene fluorides), PVF (polyvinyl fluorides), ECTFE (chlorotrifluoroethylene-ethylene copolymers), PTFE (polytetrafluoroethylenes), PFA (tetrafluoroethylene-perfluoroalkyl vinyl ether copolymers), and FEP (tetrafluoroethylene-hexafluoropropylene copolymers); amorphous fluororesins such as LUMIFLON and CYTOP available from Asahi Glass Co., Ltd. (trade names); and silicone resins. The water-repellent resins may be used alone or as a mixture thereof.

As described above, the first porous layer 34 and the first gas diffusion layer 32, which have approximately the same size, are stacked to form the first piled body 35. Similarly, the second porous layer 42 and the second gas diffusion layer 40, which have approximately the same size, are piled to form the second piled body 43.

The percolation pressure of the first piled body 35 is higher than that of the second piled body 43. The first piled body 35 has a percolation pressure of 25 to 120 kPa, and the second piled body 43 has a percolation pressure of 5 to 25 kPa. The percolation pressures of the first piled body 35 and the second piled body 43 can be controlled within the above ranges by appropriately selecting the maximum pore diameter, average pore diameter, pore diameter distribution, porosity, thickness, types and amounts (solid content concentrations) of the electron-conductive substances and the water-repellent resins, and the like in each of the first porous layer 34 and the second porous layer 42.

The porosity is preferably controlled within the range of 10% to 80%, and more preferably within the range of 20% to 50%. The thickness is preferably controlled within the range of 10 to 50 μm. In these cases, it is possible to more appropriately set the percolation pressures of the first piled body 35 and the second piled body 43.

As described above, the overall sizes of the first electrode catalyst layer 30 and the second electrode catalyst layer 38 are smaller than the overall sizes of the electrolyte membrane 24, the first outer gas diffusion layer 32, and the second outer gas diffusion layer 40. Therefore, the outer peripheral edge of the electrolyte membrane 24 is exposed on the outside of the first electrode catalyst layer 30 and the second electrode catalyst layer 38. Optionally, the first porous inner layer 34 may substantially surround the first electrode catalyst layer 30 on at least three sides thereof, as shown, including upper and lower edge portions 34U, 34L which respectively contact a first side of the electrode membrane 24. Also optionally, and in similar fashion, the second porous inner layer 42 may substantially surround the second electrode catalyst layer 38 on at least three sides thereof, as shown, including upper and lower edge portions 42U, 42L which respectively contact a second side of the electrode membrane 24. The first porous inner layer 34 and the second porous inner layer 42, respectively, are interposed between the first outer gas diffusion layer 32 and an exposed portion of a first side of the electrolyte membrane 24, and between the second outer gas diffusion layer 40 and an exposed portion of a second side of the electrolyte membrane 24, respectively.

Thus, in the depicted embodiment, the first porous inner layer 34 is disposed between the first electrode catalyst layer 30 and the first outer gas diffusion layer 32 and the upper and lower edge portions 34U, 34L of the first porous inner layer 34 are disposed between the electrolyte membrane 24 and the first outer gas diffusion layer 32. Similarly, in the depicted embodiment, the second porous inner layer 42 is disposed between the second electrode catalyst layer 38 and the second outer gas diffusion layer 40 and the upper and lower edge portions 42U, 42L of the second porous inner layer 42 are disposed between the electrolyte membrane 24 and the second outer gas diffusion layer 40. Consequently, sticking of the fibers in the first outer gas diffusion layer 32 and the second outer gas diffusion layer 40 into the electrolyte membrane 24 (particularly the outer peripheral edge thereof) can be prevented, and the physical deformation of the electrolyte membrane 24 can be prevented.

The outer peripheral edge of the electrolyte membrane 24 further extends outwardly beyond the piled bodies, as shown, and is exposed on the outside of the first piled body 35 and the second piled body 43. A first insulation sheet 36 having a frame shape is placed on a surface of the exposed portion of the electrolyte membrane 24 (the surface facing the anode-side separator 14), and this first insulation sheet extends along outer peripheral edges of the first piled body 35. Similarly, a second insulation sheet 44 having a frame shape is placed on a surface of the exposed portion of the electrolyte membrane 24 (the surface facing the cathode-side separator 16), and this second insulation sheet extends along outer peripheral edges of the second piled body 43, as shown.

For example, each of the first insulation sheet 36 and the second insulation sheet 44 may be an approximately flat, gas-impermeable film composed of PEN (polyethylene naphthalate) or the like. The thickness of the first insulation sheet 36 is approximately equal to that of the first piled body 35, so that the outer surfaces of the first insulation sheet 36 and the first piled body 35 (the first gas diffusion layer 32) are in one plane and in contact with the anode-side separator 14. Similarly, the outer surfaces of the second insulation sheet 44 and the second piled body 43 (the second gas diffusion layer 40) are in one plane and in contact with the cathode-side separator 16.

By forming the first insulation sheet 36 and the second insulation sheet 44 in this manner, transfer and mixing of the reactant gases between the anode 26 and the cathode 28 and the out leakage can be effectively prevented.

Seals 46 and 48 surrounding the edges of the first gas diffusion layer 32 and the second gas diffusion layer 40 may be placed on the anode-side separator 14 and the cathode-side separator 16 respectively. The out leakage can be efficiently prevented by using the seals 46, 48.

In the following description, when it is not necessary to distinguish the first electrode catalyst layer 30 and the second electrode catalyst layer 38, they are simply referred to also as the electrode catalyst layers. Similarly, the first gas diffusion layer 32 and the second gas diffusion layer 40 are simply referred to also as the gas diffusion layers, the first porous layer 34 and the second porous layer 42 are simply referred to also as the porous layers, and the first piled body 35 and the second piled body 43 are simply referred to also as the piled bodies.

A method for producing the above membrane electrode assembly 12 will be described below.

In the production of the membrane electrode assembly 12, the proton-conductive polymer of the cation-exchange resin is selected first, and the polymer is formed into a rectangular sheet to obtain the electrolyte membrane 24.

The first electrode catalyst layer 30 is formed on one surface of the electrolyte membrane 24, and the second electrode catalyst layer 38 is formed on the other surface. Specifically, the catalyst particles and an organic solvent are added to a solution containing a polymer similar to the polymer used in the electrolyte membrane 24 (the polymer electrolyte), and the solution is mixed to prepare a catalyst paste.

Then, a predetermined amount of the catalyst paste is applied to a film composed of PTFE or the like. The catalyst paste-coated surface of the film is thermally compression-bonded to the one surface of the electrolyte membrane 24, and the film is peeled off, whereby the catalyst paste is transferred to the one surface of the electrolyte membrane 24 to form the first electrode catalyst layer 30. The catalyst paste is transferred also to the other surface of the electrolyte membrane 24 in the same manner to form the second electrode catalyst layer 38.

Meanwhile, the first porous layer 34 is formed on the first gas diffusion layer 32 to obtain the first piled body 35, and the second porous layer 42 is formed on the second gas diffusion layer 40 to obtain the second piled body 43.

Specifically, for example, the electron-conductive substance and the water-repellent resin are mixed in an organic solvent such as ethanol, propanol, or ethylene glycol to prepare a paste for forming the porous layers. A predetermined amount (thickness) of this porous layer paste is applied to the first gas diffusion layer 32, and is heat-treated to form the first porous layer 34, whereby the first piled body 35 is obtained.

Similarly, a predetermined amount of the porous layer paste is applied to the second gas diffusion layer 40, and is heat-treated to form the second porous layer 42, whereby the second piled body 43 is obtained. It should be noted that the porous layer paste for forming the first piled body 35 and the porous layer paste for forming the second piled body 43 may have different compositions.

For example, the percolation pressures of the first piled body 35 and the second piled body 43 can be controlled within the above-described ranges respectively by appropriately selecting the amount (thickness) of the porous layer paste applied to the first gas diffusion layer 32 or the second gas diffusion layer 40, the method for applying thereof, the concentrations (solid content concentrations) of the electron-conductive substance and the water-repellent resin in the organic solvent in the porous layer paste, etc. Examples of the method for applying the pastes include a method using screen printing, a method using a blade coater, or the like. In a case where a porous layer is formed by using the screen printing, the porosity of the porous layer becomes larger in comparison with the case where the porous layer is formed by using the blade coater. Accordingly, the method for applying the paste may be suitably selected from those methods, depending on the desired porosity.

Further, physical property values of the first piled body 35 and the second piled body 43 may be controlled by appropriately adjusting a physical property of the base material constructing the first gas diffusion layer 32 or the second gas diffusion layer 40, the concentration of the water-repellent resin added to the base material, etc. In this case, the percolation pressures or the like of the first piled body 35 and the second piled body 43 can be controlled more appropriately by setting the percolation pressure, as the physical property, of the base material to a range from 2 to 20 kPa.

The first porous layer 34 and the second porous layer 42 may be formed as sheets. In this case, the porous layer paste is prepared at increased concentrations (solid content concentrations) of the electron-conductive substance and the water-repellent resin in the organic solvent, the solvent is removed by extraction, and the resultant is subjected to a stretching treatment or the like, to form the sheets of the first porous layer 34 and the second porous layer 42. Each of the first porous layer 34 and the second porous layer 42 may be formed by laminating a plurality of the sheets.

The sheets of the first porous layer 34 and the second porous layer 42 are placed on the first gas diffusion layer 32 and the second gas diffusion layer 40 respectively. The placed sheets are pressed and heated (hot-pressed), whereby the first porous layer 34 is thermally compression-bonded to the first gas diffusion layer 32 to obtain the first piled body 35, and the second porous layer 42 is thermally compression-bonded to the second gas diffusion layer 40 to obtain the second piled body 43.

The obtained first piled body 35 and second piled body 43 are placed on the first electrode catalyst layer 30 and the second electrode catalyst layer 38 respectively in such a manner that the first porous layer 34 and the second porous layer 42 face the first electrode catalyst layer 30 and the second electrode catalyst layer 38 respectively. The components are integrated by thermal compression bonding or the like to produce the membrane electrode assembly 12.

As described above, the first porous layer 34 is interposed between the first gas diffusion layer 32 and the first electrode catalyst layer 30 and between the first gas diffusion layer 32 and the electrolyte membrane 24. Therefore, even in a case where a load is applied to the first and second piled bodies 35, 43 in the thermal compression bonding process, the sticking of the fibers in the first gas diffusion layer 32 into the electrolyte membrane 24 can be prevented, and the physical deformation of the electrolyte membrane 24 can be prevented.

The membrane electrode assembly 12 is sandwiched between the anode-side separator 14 and the cathode-side separator 16 to produce the fuel cell 10.

The fuel cell 10 containing the membrane electrode assembly 12 of this embodiment has the above basic structure. The advantageous effects thereof will be described below.

When the fuel cell 10 is operated to generate electric power, the oxygen-containing gas is supplied to the oxygen-containing gas inlet passage, and the fuel gas such as the hydrogen-containing gas is supplied to the fuel gas inlet passage. Further, the coolant such as pure water or ethylene glycol is supplied to the coolant inlet passage.

The coolant is introduced from the coolant inlet passage into the coolant flow field 22 formed between the anode-side separator 14 and the cathode-side separator 16. In the coolant flow field 22, the coolant is moved in the gravitational direction (the arrow C direction shown in FIG. 1). Thus, the coolant acts to cool the entire power generation surface of the membrane electrode assembly 12, and is then discharged from the coolant outlet passage.

The oxygen-containing gas is introduced from the oxygen-containing gas inlet passage into the oxygen-containing gas flow field 20 on the cathode-side separator 16. In the oxygen-containing gas flow field 20, the oxygen-containing gas flows in the arrow B direction along the cathode 28 in the membrane electrode assembly 12.

The fuel gas is introduced from the fuel gas inlet passage into the fuel gas flow field 18 on the anode-side separator 14. In the fuel gas flow field 18, the fuel gas flows in the arrow B direction along the anode 26 in the membrane electrode assembly 12.

Consequently, in the membrane electrode assembly 12, the fuel gas is supplied to the anode 26 and moved through the first gas diffusion layer 32 and the first porous layer 34, the oxygen-containing gas is supplied to the cathode 28 and moved through the second gas diffusion layer 40 and the second porous layer 42, and the fuel gas and the oxygen-containing gas are consumed in electrochemical reactions (electrode reactions) in the first electrode catalyst layer 30 and the second electrode catalyst layer 38 respectively, whereby the fuel cell 10 generates the electric power.

More specifically, the fuel gas is supplied from the fuel gas flow field 18 to the anode 26 and moved through the first gas diffusion layer 32 and the first porous layer 34, and hydrogen molecules in the fuel gas are ionized in the first electrode catalyst layer 30 to generate protons ($H^+$) and electrons. The electrons are extracted as an electric energy for energizing an external load (not shown) electrically connected to the fuel cell 10. The protons are moved through the electrolyte membrane 24 and reach the cathode 28 in the membrane electrode assembly 12. Incidentally, the protons are moved from the anode 26 to the cathode 28 accompanying water in the electrolyte membrane 24.

The protons reach the cathode 28, the electrons reach the cathode 28 after the energization of the external load, and the oxygen-containing gas is supplied to the cathode 28 and moved through the second gas diffusion layer 40 and the second porous layer 42. The protons, the electrons, and oxygen molecules in the oxygen-containing gas are bonded to generate water in the second electrode catalyst layer 38 of the cathode 28. This water is hereinafter referred to also as the generated water.

In order to achieve an excellent proton conductivity in the electrolyte membrane 24 during the electrode reactions, it is necessary to maintain the electrolyte membrane 24 in a wet state. However, in a case where the generated water or the like remains in a pore in the first electrode catalyst layer 30, the second electrode catalyst layer 38, the first gas diffusion layer 32, or the second gas diffusion layer 40, the path of the reactant gas may be clogged, and thus flooding may be caused to inhibit the electrode reaction. Therefore, the anode 26 and the cathode 28 are required to have a satisfactory water retention property for maintaining the electrolyte membrane 24 in the wet state and a satisfactory water discharge property for rapidly diffusing the reactant gas. These incompatible properties have to be well balanced.

In the membrane electrode assembly 12, as described above, the first porous layer 34 is interposed between the electrolyte membrane 24 and the first gas diffusion layer 32, and the second porous layer 42 is interposed between the electrolyte membrane 24 and the second gas diffusion layer 40. Further, the percolation pressures of the formed first piled body 35 and second piled body 43 are controlled within the above ranges respectively. Therefore, the generated water permeability can be controlled between the first electrode catalyst layer 30 and the first piled body 35 and between the second electrode catalyst layer 38 and the second piled body 43.

Thus, the membrane electrode assembly 12 can exhibit well-balanced water retention and water discharge properties between the anode 26 and the cathode 28, so that the electrolyte membrane 24 can have the excellent proton conductivity, and the reactant gases can be more efficiently diffused to accelerate the electrode reactions. Consequently, the power generation property of the fuel cell 10 containing the membrane electrode assembly 12 can be improved.

Accordingly, in the membrane electrode assembly 12, because of the piled bodies having the controlled percolation pressures, the contact of the fibers in the gas diffusion layers with the electrolyte membrane 24 can be advantageously avoided, and the physical deformation of the electrolyte membrane 24 can be easily prevented. In addition, the power generation reactions on the anode 26 and the cathode 28 can be accelerated to appropriately improve the power generation property of the fuel cell 10.

In the membrane electrode assembly 12, even in a case where the first electrode catalyst layer 30 is made thinner than the second electrode catalyst layer 38 in view of lowering the activation overvoltage of the power generation reaction (oxygen reduction) on the cathode 28, the above advantageous effects can be desirably achieved.

The percolation pressure of the first piled body 35 is higher than that of the second piled body 43, and the first porous layer 34 has a lower porosity and is denser than the second porous layer 42. Therefore, even in the case where the first electrode catalyst layer 30 is thinner, the sticking of the fibers and the like in the first gas diffusion layer 32 through the first electrode catalyst layer 30 into the electrolyte membrane 24 can be avoided, and the physical deformation of the electrolyte membrane 24 can be effectively prevented.

On the other hand, the second porous layer 42 in the cathode 28, on which water is generated, has a higher porosity. Therefore, the reactant gas can be efficiently diffused while preventing the flooding, so that the generated water is not excessively transferred to the second gas diffusion layer 40, and drying of the electrolyte membrane 24 can be prevented.

Consequently, the membrane electrode assembly 12 can have a simple structure capable of effectively preventing the physical deformation of the electrolyte membrane 24. Further, the water retention and water discharge properties can be well balanced in the anode 26 and the cathode 28 to improve the power generation property.

The present invention is not particularly limited to the above embodiment, and various changes and modifications may be made therein without departing from the scope of the invention.

EXAMPLES

Example 1

(1) First and second gas diffusion layers having the same structure were formed in the same manner. Specifically, a carbon paper having a bulk density of 0.31 g/m$^2$ and a thickness of 190 µm was impregnated with a dispersion liquid of a tetrafluoroethylene-hexafluoropropylene copolymer (FEP), FEP 120-JRB DISPERSION (trade name) available from Du Pont-Mitsui Fluorochemicals Co., Ltd., and the resultant paper was dried at 120° C. for 30 minutes. In this step, the dry weight ratio of the FEP to the carbon paper was 2.4% by weight.

(2) 3 to 20 g of a vapor-grown carbon VGCF (trade name) available from Showa Denko K.K., 5 to 50 g of a dispersion liquid FEP 120-JRB (having a solid content concentration of 54%, trade name) available from Du Pont-Mitsui Fluorochemicals Co., Ltd., and 200 g of ethylene glycol were stirred and mixed using a ball mill to prepare a porous layer paste A.

(3) The porous layer paste A prepared in (2) was applied by a blade coater to the first gas diffusion layer formed in (1) in such a manner that the resultant first porous layer had a thickness of 18 µm. The applied paste was heat-treated at 380° C. for 30 minutes, whereby the first porous layer was formed to prepare a first piled body.

(4) The porous layer paste A prepared in (2) was screen-printed as an ink on the second gas diffusion layer formed in (1) in such a manner that the resultant second porous layer had a thickness of 18 µm. The printed paste was heat-treated at 380° C. for 30 minutes, whereby the second porous layer was formed to prepare a second piled body.

(5) A platinum catalyst LSA (trade name) available from BASF was added to an ion-conductive polymer solution DE2020CS (trade name) available from Du Pont such that the weight ratio of the LSA to the DE2020CS was 0.1. The solution was stirred and mixed in a ball mill to prepare a catalyst paste.

(6) The catalyst paste prepared in (5) was applied to a PTFE sheet in such a manner that the platinum density was 0.7 mg/cm$^2$. The applied paste was heat-treated at 120° C. for 60 minutes to obtain a sheet for transferring a first electrode catalyst layer to one surface of an electrolyte membrane.

(7) The catalyst paste prepared in (5) was applied to a PTFE sheet in such a manner that the platinum density was 0.1 mg/cm$^2$. The applied paste was heat-treated at 120° C. for 60 minutes to obtain a sheet for transferring a second electrode catalyst layer to the other surface of the electrolyte membrane.

(8) The catalyst paste-coated surfaces of the sheets prepared in (6) and (7) were thermally compression-bonded to the surfaces of a fluorine-containing electrolyte membrane having a thickness of 24 µm and an ion-exchange capacity of 1.05 meq/g, and the PTFE sheets were peeled off. Thus, by using a decal method, the first electrode catalyst layer was formed on one surface of the electrolyte membrane, and the second electrode catalyst layer was formed on the other surface.

(9) The first porous layer on the first piled body formed in (3) and the second porous layer on the second piled body formed in (4) were thermally compression-bonded at 120° C. under a surface pressure of 30 kgf/cm$^2$ to the first and second electrode catalyst layers formed on the electrolyte membrane in (8) respectively. A membrane electrode assembly of Example 1 was produced in this manner.

Example 2

In the step of (3), the porous layer paste A prepared in (2) was applied by the blade coater to the first gas diffusion layer formed in (1) in such a manner that the resultant first porous layer had a thickness of 30 µm. A membrane electrode assembly of Example 2 was produced in the same manner as Example 1 except for the step of (3).

Example 3

In the step of (4), the porous layer paste A prepared in (2) was screen-printed as the ink on the second gas diffusion layer formed in (1) in such a manner that the resultant second porous layer had a thickness of 30 µm. A membrane electrode assembly of Example 3 was produced in the same manner as Example 1 except for the step of (4).

Example 4

In the step of (3), the porous layer paste A prepared in (2) was applied by the blade coater to the first gas diffusion layer formed in (1) in such a manner that the resultant first porous layer had a thickness of 20 µm. In the step of (4), the porous layer paste A prepared in (2) was applied by the blade coater to the second gas diffusion layer formed in (1) in such a manner that the resultant second porous layer had a thickness of 5 µm. A membrane electrode assembly of Example 4 was produced in the same manner as Example 1 except for the steps of (3) and (4).

Example 5

In the step of (3), the porous layer paste A prepared in (2) was applied by the blade coater to the first gas diffusion layer formed in (1) in such a manner that the resultant first porous layer had a thickness of 20 µm. In the step of (4), the porous layer paste A prepared in (2) was applied by the blade coater to the second gas diffusion layer formed in (1) in such a manner that the resultant second porous layer had a thickness of 17 µm. A membrane electrode assembly of Example 5 was produced in the same manner as Example 1 except for the steps of (3) and (4).

Example 6

In the step of (3), the porous layer paste A prepared in (2) was applied by the blade coater to the first gas diffusion layer formed in (1) in such a manner that the resultant first porous layer had a thickness of 35 µm. A membrane electrode assembly of Example 6 was produced in the same manner as Example 1 except for the step of (3).

Example 7

In the step of (3), the porous layer paste A prepared in (2) was applied by the blade coater to the first gas diffusion layer formed in (1) in such a manner that the resultant first porous layer had a thickness of 40 µm. A membrane electrode assembly of Example 7 was produced in the same manner as Example 1 except for the step of (3).

Comparative Example 1

In the step of (3), the porous layer paste A prepared in (2) was screen-printed as the ink on the first gas diffusion layer formed in (1) in such a manner that the resultant first porous layer had a thickness of 18 µm. A membrane electrode assembly of Comparative Example 1 was produced in the same manner as Example 1 except for the step of (3).

Comparative Example 2

In the step of (3), the porous layer paste A prepared in (2) was applied by the blade coater to the first gas diffusion layer formed in (1) in such a manner that the resultant first porous layer had a thickness of 15 µm. A membrane electrode assembly of Comparative Example 2 was produced in the same manner as Example 1 except for the step of (3).

Comparative Example 3

In the step of (3), the porous layer paste A prepared in (2) was applied by the blade coater to the first gas diffusion layer formed in (1) in such a manner that the resultant first porous layer had a thickness of 17 µm. A membrane electrode assembly of Comparative Example 3 was produced in the same manner as Example 1 except for the step of (3).

Comparative Example 4

In the step of (3), the porous layer paste A prepared in (2) was applied by the blade coater to the first gas diffusion layer formed in (1) in such a manner that the resultant first porous layer had a thickness of 17 µm. In the step of (4), the porous layer paste A prepared in (2) was screen-printed as the ink on the second gas diffusion layer formed in (1) in such a manner that the resultant second porous layer had a thickness of 30 µm. A membrane electrode assembly of Comparative Example 4 was produced in the same manner as Example 1 except for the steps of (3) and (4).

Comparative Example 5

In the step of (2), 12 g of a carbon VULCAN XC-72R (trade name) available from Cabot Corporation, 20 g of the dispersion liquid FEP 120-JRB (having a solid content concentration of 54%, trade name) available from Du Pont-Mitsui Fluorochemicals Co., Ltd., and 155 g of ethylene glycol were stirred and mixed using a ball mill to prepare an additional porous layer paste B.

In the step of (3), the porous layer paste B was screen-printed as an ink on the first gas diffusion layer formed in (1) in such a manner that the resultant first porous layer had a thickness of 20 µm. A membrane electrode assembly of Comparative Example 5 was produced in the same manner as Example 1 except for the steps of (2) and (3).

Comparative Example 6

In the step of (3), the porous layer paste A prepared in (2) was applied by the blade coater to the first gas diffusion layer formed in (1) in such a manner that the resultant first porous layer had a thickness of 20 µm. In the step of (4), the second porous layer was not formed on the second gas diffusion layer formed in (1). A membrane electrode assembly of Comparative Example 6 was produced in the same manner as Example 1 except for the steps of (3) and (4). Thus, in the membrane electrode assembly of Comparative Example 6, the cathode had the second gas diffusion layer instead of the second piled body.

Comparative Example 7

In the step of (3), the porous layer paste A prepared in (2) was applied by the blade coater to the first gas diffusion layer formed in (1) in such a manner that the resultant first porous layer had a thickness of 20 µm. In the step of (4), the porous layer paste A prepared in (2) was applied by the blade coater to the second gas diffusion layer formed in (1) in such a manner that the resultant second porous layer had a thickness of 20 µm. A membrane electrode assembly of Comparative Example 7 was produced in the same manner as Example 1 except for the steps of (3) and (4).

Comparative Example 8

In the step of (3), the porous layer paste A prepared in (2) was applied by the blade coater to the first gas diffusion layer formed in (1) in such a manner that the resultant first porous layer had a thickness of 45 µm. A membrane electrode assembly of Comparative Example 8 was produced in the same manner as Example 1 except for the step of (3).

Figure 2:
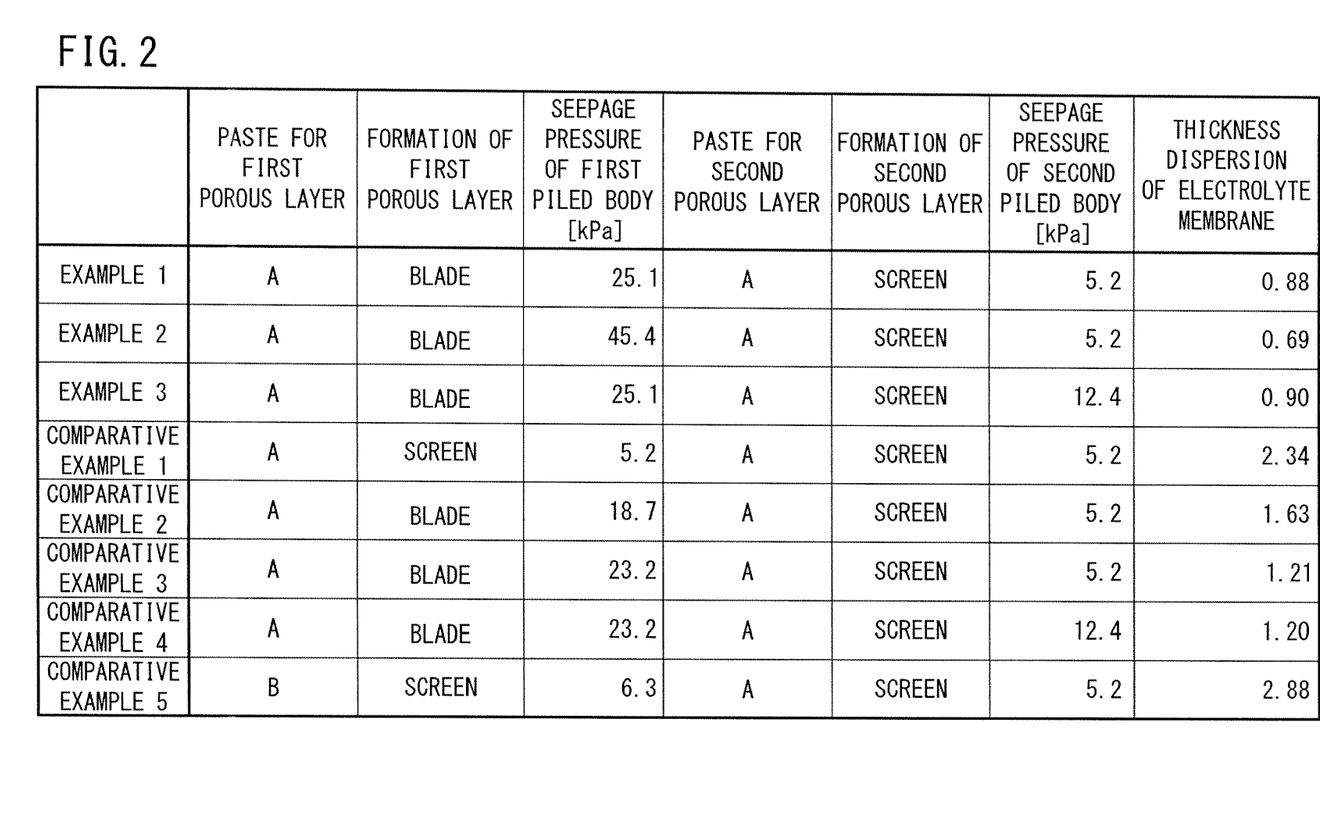
FIG. 2 is a table showing the preparation conditions of first and second porous layers, the percolation pressures of first and second piled bodies and the thickness dispersions of electrolyte membranes in membrane-electrode assemblies in Examples 1 to 3 and Comparative Examples 1 to 5.

In the membrane-electrode assemblies of Examples 1 to 7 and Comparative Examples 1 to 8, the percolation pressures [kPa] of the first and second piled bodies were measured. In the membrane-electrode assemblies of Examples 1 to 3 and Comparative Examples 1 to 5, the thickness dispersions of the electrolyte membranes were measured. The measurement results of the membrane-electrode assemblies of Examples 1 to 3 and Comparative Examples 1 to 5 are shown in FIG. 2 together with the preparation conditions of the porous layers.

The percolation pressure of each piled body was measured using a perm-porometer manufactured by PMI (Porous Materials, Inc.) Specifically, first, the piled body was cut into a circular shape having a diameter of 1 inch to prepare a piled body sample. A pure water was dropped onto the porous layer in the piled body sample to form a water film, and an air pressure was gradually applied to the water film by the perm-porometer. The minimum pressure, required for transferring the pure water through the piled body sample, was measured as the percolation pressure of the piled body.

The thickness dispersion of the electrolyte membrane was measured using a scanning electron microscope (SEM). Specifically, a 5-mm straight line was selected as a measurement range on the electrolyte membrane, and the thicknesses of 500 points arranged at intervals of 10 μm in the measurement range were measured. The thickness dispersion Q(X) of the electrolyte membrane was calculated using the measurement results in the following equation (1):

$$Q(X)=E(X^2)-(E(X))^2 \qquad (1).$$

E(X) represents a function (expectation) of the mean value of the thicknesses measured in the 500 points, and $E(X^2)$ represents a function (expectation) of the mean-square value of the thicknesses measured in the 500 points. Q(X) is obtained in the unit of μm².

As shown in FIG. 2, it is clear that when the first piled body has a percolation pressure of 25 kPa or more, the thickness dispersion of the electrolyte membrane can be reduced to less than 1.0. Thus, though the electrolyte membrane is often physically deformed by the anode having the thinner first electrode catalyst layer as described above, the thickness unevenness of the electrolyte membrane can be desirably reduced and the physical deformation of the electrolyte membrane can be effectively prevented by controlling the percolation pressure of the first piled body at 25 kPa or more.

Furthermore, a cell was produced using each of the membrane-electrode assemblies of Examples 1 to 7 and Comparative Examples 6 to 8. A fuel gas and an oxygen-containing gas were supplied to the cell, the cell voltage $V_{100}(V)$ of the cell was measured at a gas pressure of 100 kPa, and the cell voltage $V_{200}(V)$ of the cell was measured at a gas pressure of 200 kPa. In addition, the cell voltage difference $\Delta V(V_{200}-V_{100})$ was calculated from the difference between the cell voltages $V_{200}$ and $V_{100}$.

Specifically, the power generation was performed under the following conditions of: a power generation temperature of 50° C.; a fuel gas relative humidity (RH) of 50%; an oxygen-containing gas relative humidity (RH) of 100%; a fuel gas availability of 70%; an oxygen-containing gas availability of 60%; and an output current density of 1.0 A/cm². In the cell voltage measurement, the cell was maintained for 10 minutes under the above gas pressure, and each of the cell voltage $V_{100}$ and cell voltage $V_{200}$ was an average value measured in the last one minute.

Figure 3:
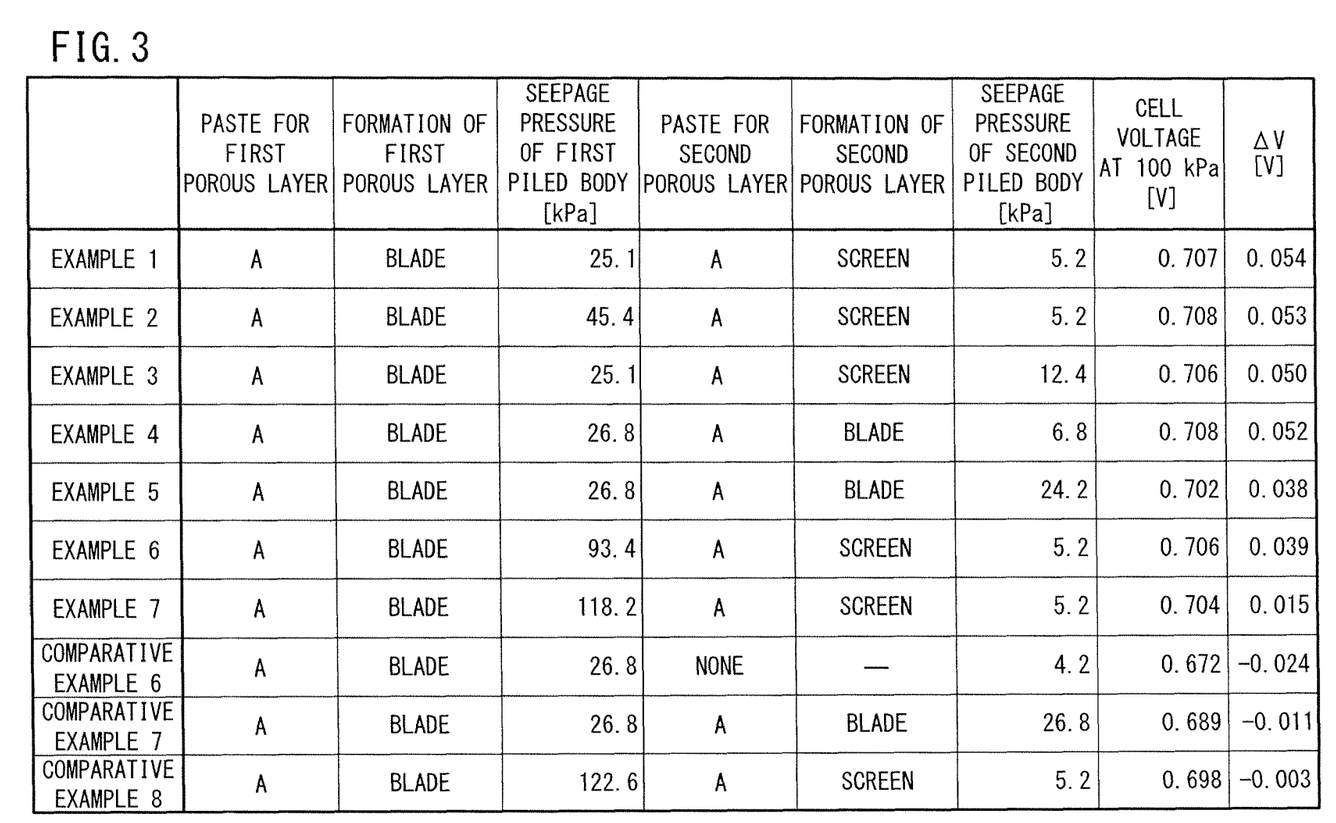
FIG. 3 is a table showing the preparation conditions of first and second porous layers, the percolation pressures of first and second piled bodies and the cell voltages at a gas pressure of 100 kPa, and the cell voltage differences ΔV in membrane-electrode assemblies in Examples 1 to 7 and Comparative Examples 6 to 8.

Thus obtained cell voltages ($V_{100}$) at the gas pressure of 100 kPa and cell voltage differences ΔV are shown in FIG. 3 together with the preparation conditions of the porous layers and the percolation pressures.

As shown in FIG. 3, it is clear that when the first piled body has a percolation pressure of 120 kPa or less and the second piled body has a percolation pressure of 5 to 25 kPa, the cell voltage $V_{100}$ can be increased to 0.70 V or more to achieve an excellent power generation property. Further, it is clear that when the piled bodies have the percolation pressures within the above ranges, the cell voltage can be increased with the gas pressure. Thus, when the piled bodies have the percolation pressures within the above ranges, the power generation reactions can be efficiently carried out while preventing the flooding even under a higher gas pressure.

As is clear from the results, when the percolation pressure of the first piled body is higher than that of the second piled body, the first piled body has a percolation pressure of 25 to 120 kPa, and the second piled body has a percolation pressure of 5 to 25 kPa, the thickness dispersion of the electrolyte membrane can be reduced, so that the physical deformation of the electrolyte membrane can be effectively prevented. Therefore, the components can be readily transferred between the anode and the cathode, and the electrode reactions can be efficiently carried out, whereby the power generation property of the fuel cell can be improved. Further, deterioration of the electrolyte membrane can be prevented, the gas barrier property against the reactant gases can be improved, and thus the durability of the membrane electrode assembly can be improved.

In addition, the generated water can be prevented from being excessively transferred from the electrode catalyst layer to the gas diffusion layer and from excessively remaining around the electrode catalyst layer and the gas diffusion layer. Thus, the water retention and water discharge properties can be well balanced between the anode and the cathode to improve the power generation property.

Although certain preferred embodiments of the present invention have been shown and described in detail, it should be understood that various changes and modifications may be made therein without departing from the scope of the appended claims.

What is claimed is:

1. A membrane electrode assembly comprising a solid polymer electrolyte membrane sandwiched between an anode and a cathode,
    wherein the anode contains a first electrode catalyst layer facing the electrolyte membrane, and the anode further comprises a first piled body comprising a first gas diffusion layer and a first porous layer interposed between the first electrode catalyst layer and the first gas diffusion layer,
    wherein the cathode contains a second electrode catalyst layer facing the electrolyte membrane, and the cathode further comprises a second piled body comprising a second gas diffusion layer and a second porous layer interposed between the second electrode catalyst layer and the second gas diffusion layer, each of the first and second porous layers being thermally compression-bonded to the corresponding gas diffusion layer to form the first and second piled bodies,
    each of the first porous layer and the second porous layer having a thickness in a range of 10 to 50 micrometers and a porosity in a range of 20 to 50 percent, with the porosity of the second porous layer being greater than the porosity of the first porous layer,
    wherein each of the first porous layer and the second porous layer comprises an electron-conductive substance and a water-repellent resin, and is configured to resist deformation of the electrolyte membrane, wherein the first piled body has a percolation pressure higher than that of the second piled body, wherein the first piled body has a percolation pressure in a range of 25 to 120 kPa and the second piled body has a percolation pressure in a range of 5 to 25 kPa, and wherein the thickness of the first porous layer is equal to or greater than the thickness of the second porous layer.

2. The membrane electrode assembly of claim 1, wherein each of the anode and cathode further comprises a frame-shaped insulation sheet extending around an outer edge of the corresponding piled body thereof.

3. The membrane electrode assembly of claim 2, wherein each of the insulation sheets is formed from a substantially flat, gas-impermeable film which comprises polyethylene naphthalate.

4. The membrane electrode assembly of claim 1, wherein the first electrode catalyst layer is thinner than the second electrode catalyst layer.

5. A membrane electrode assembly comprising a solid polymer electrolyte membrane sandwiched between an anode and a cathode, wherein the anode contains a first electrode catalyst layer facing the electrolyte membrane, and the anode further comprises a first piled body comprising a first gas diffusion layer and a first porous layer interposed between the first electrode catalyst layer and the first gas diffusion layer, each of the first and second porous layers being thermally compression-bonded to the corresponding gas diffusion layer to form the first and second piled bodies, each of the first porous layer and the second porous layer having a thickness in a range of 10 to 50 micrometers and a porosity in a range of 20 to 50 percent, with the porosity of the second porous layer being greater than the porosity of the first porous layer, wherein each of the first porous layer and the second porous layer comprises an electron-conductive substance and a water-repellent resin, and is configured to resist deformation of the electrolyte membrane, wherein the cathode contains a second electrode catalyst layer facing the electrolyte membrane, and the cathode further comprises a second piled body comprising a second gas diffusion layer and a second porous layer interposed between the second electrode catalyst layer and the second gas diffusion layer, wherein the first and second porous layers, respectively, are configured to cover edge portions of the corresponding electrode catalyst layers, wherein the first piled body has a percolation pressure higher than that of the second piled body, and wherein the first piled body has a percolation pressure in a range of 25 to 120 kPa and the second piled body has a percolation pressure in a range of 5 to 25 kPa.

* * * * *